Patented Feb. 6, 1934

1,946,115

UNITED STATES PATENT OFFICE 1,946,115

METHOD OF PRODUCING 3-MENTHONE

Walter Schoeller and Erwin Schwenk, Berlin-Westend, and Erich Borgwardt, Berlin-Pankow, Germany, assignors to Schering-Kahlbaum A. G., Berlin, Germany No Drawing. Application October 8, 1931, Serial No. 567,766, and in Germany October 17, 1930

5 Claims. (Cl. 260—131)

Our invention refers to the production of 3-menthone and more especially to means whereby this compound can be produced in a simpler and more efficient manner than by the methods hitherto used.

As is well known to those skilled in the art, the ethylene oxides obtainable by acting for instance with per-acids such as peracetic acid or perbenzoic acid on ethylenes can be converted into ketones or aldehydes either by heating or under the influence of dilute acids.

We have now found that a similar reaction can be carried through with the cyclic oxides obtainable for instance by acting with per-acids on the cyclo-olefines, the per-acids being dissolved in an inert solvent and the non-saturated hydrocarbons being added at ordinary temperatures (Proleshajew, Berichte der Deutschen Chemischen Gesellschaft, 42, p. 4811.

Thus 3-menthene oxide having the formula

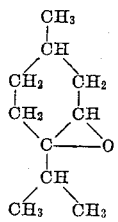

can be converted by simple heating to 150°–450° C. into 3-menthone having the formula

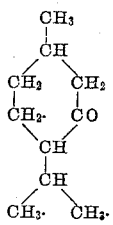

which can be used with advantage as starting material for the recovery of the valuable 3-menthol.

In the course of our experiments we have further found that the reaction can be accelerated by the use of surface catalysts, such as pumice or silica gel.

The reaction according to the present invention offers the further advantage of occurring in the absence of water whereby re-conversion into glycols is avoided. Moreover the process can be carried through in a continuous manner.

In practising our invention we prefer proceeding for instance as follows:

Example 1

10 parts 3-menthene oxide are heated in a closed vessel and in the presence of 0.5 parts silica gel during 2 hours to 250° C. The slightly yellow coloured product of reaction is distilled with steam to separate the ketone which is purified by distillation. There result 8 parts menthone boiling at 204–208° C.

Example 2

15 parts 3-menthene oxide are subjected to distillation and the vapors are slowly passed in contact with a catalyst formed by pieces of pumice heated to 230 to 250° C. The escaping vapors are condensed and the 3-menthone thus formed purified by distillation. The yield is about 90% of the calculated quantity.

Various changes may be made in the details disclosed in the foregoing specification without departing from the invention or sacrificing the advantages thereof.

We claim:—

1. The process of producing 3-menthone comprising heating 3-menthene oxide in contact with a surface catalyst to about 250° C.

2. The process of producing 3-methone comprising heating 3-menthene oxide in contact with silica gel to about 250° C.

3. The process of producing 3-menthone comprising heating 3-menthene oxide in contact with pumice to about 250° C.

4. The process of producing menthone comprising conducting the vapour of 3-menthene oxide in contact with silica gel heated to about 250° C.

5. The process of producing menthone comprising conducting the vapor of 3-menthene oxide in contact with pumice heated to about 250° C.

WALTER SCHOELLER.
ERWIN SCHWENK.
ERICH BORGWARDT.